United States Patent [19]

Engelhardt

[11] Patent Number: 4,531,947
[45] Date of Patent: Jul. 30, 1985

[54] COLOR PROCESS FOR SPECTACLE FRAME COATED WITH POLYESTER

[75] Inventor: David R. Engelhardt, Edwardstown, Australia

[73] Assignee: R. Englehardt Nominees Pty. Ltd., Edwardstown, Australia

[21] Appl. No.: 593,626

[22] Filed: Mar. 26, 1984

Related U.S. Application Data

[63] Continuation-in-part of Ser. No. 338,125, Jan. 8, 1982, abandoned.

[51] Int. Cl.³ .................. B05D 5/06; B29D 3/02; C09D 3/02; C25D 3/02
[52] U.S. Cl. .................................. 8/495; 8/506; 8/512; 8/515; 8/516; 29/20; 427/195
[58] Field of Search .................... 8/512, 495

[56] References Cited

U.S. PATENT DOCUMENTS

| 3,743,529 | 7/1973 | Ramsay | 8/552 |
| 3,939,547 | 2/1976 | Bermer et al. | 427/195 |
| 4,111,647 | 9/1978 | Schleifstein | 8/512 |
| 4,162,892 | 7/1979 | Wright et al. | 8/512 |
| 4,172,702 | 10/1979 | Bermer et al. | 8/506 |
| 4,251,582 | 2/1981 | Bermer et al. | 8/512 |

FOREIGN PATENT DOCUMENTS 53-73224  6/1978  Japan.

OTHER PUBLICATIONS

H. Ahmed, "Coloring of Plastics", (Van Nash and Rheinhold, New York), 1979, pp. 167-168.

Primary Examiner—A. Lionel Clingman
Attorney, Agent, or Firm—Bert J. Lewen

[57] ABSTRACT

A thick coat of polyester powder is imparted onto a heated spectacle frame, some of the powder is removed from the frame hinges and replaced with a thin coat, the coated product is baked to fuse the powder and subsequently immersed in a heated aqueous dispersion of a disperse type dye, and the dyed product is subsequently reheated to a temperature sufficient to cause dye diffusion into the fused coating.

9 Claims, 15 Drawing Figures

COLOR PROCESS FOR SPECTACLE FRAME COATED WITH POLYESTER

This application is a continuation-in-part of my prior co-pending application Ser. No. 338,125, filed Jan. 8, 1982 now abandoned.

This invention relates to a method of colour coating the frames of spectacles or sunglasses.

BACKGROUND OF THE INVENTION

The usual method of construction of a metal spectacle or sunglass frame is to produce the lens retention rings, side arms and frame pieces and assemble these. Subsequently a precious metal plate layer is applied for corrosion protection.

However, because of fashion trends, coloured metal frames are sometimes required, as well as a gold or silver plating finish.

Coloured metal frames encountered on the market today have many problems associated with the coloured metal finish, and these include:
(a) poor adhesion of the plastic coat on the metal substrate,
(b) thin coverage which will wear off quickly because of poor abrasion resistance,
(c) inability of colour to withstand harsh solvents, and, most importantly,
(d) inability to achieve a very smooth, ripple-free finish on the finished frame, and
(e) absence of sufficient protection of the metal surfaces which bound the eye wire groove where the lens edge is retained, resulting in corrosion occasioned by perspiration entering the groove.

The main object of this invention is to provide improvements in the application of a colour coating which will reduce these problems in the production of coloured metal frames.

PRIOR ART

The reader is referred to the following prior art: A. MAN-MADE FIBRES, R. W. Moncrieff, Wiley, pp. 450 to 457.

This article outlines the difficulties encountered with dyeing of polyester fibres, due to lack of hydrophilic properties and of reactive groups, and the polymer chains being closely packed. It identifies that the only dyestuffs with measurable affinity for Terylene are those applied from aqueous dispersion.

By using a high temperature, the polyester molecules are more free to move and the dyestuff molecules can penetrate faster.

Use of a carrier (swelling agent) is discussed, and dyeing is more rapidly carried out and better penetration is achieved.

Use of the Thermosol process is also discussed, wherein the dyed fabric is subsequently heated to a temperature of 175° C. to 200° C.

B. FORMULATION OF COLORANTS FOR DOMESTIC USERS, Eric C. Dolton, Review of Progress in Coloration Vol. 11, 1981 (Society of Dyers and Colourists).

In this article, the author discusses disperse dyes used to "give some colour to polyester". The use of an alkali in a dye bath is also considered. C. U.S. Pat. No. 4,172,702, Bernier, discloses dry powder epoxy, nylon, or co-polymers containing polyester or acrylic resin, sprayed electrostatically onto a phosphoric acid treated metal surface, and subsequently heated to form a film, but stopping the heating short of complete transformation to allow a sufficient quantity of proton acceptor groups to remain untransformed or active. Polyester layers are thin (from 12 to 127 microns). The layer was subsequently dyed, and many classes of dyes were said to be successful in a conventional dyeing process. Acid dyes in acqueous solution were described as fixed by salt formation.

D. U.S. Pat. No. 3,743,529, Ramsay, discloses depositing a polyester powder electrostatically onto a carpet back and subjecting to heat and pressure, and subsequently dyeing with, inter alia, a disperse type dye.

However, none of the above described processes result in adhesion of the plastics material to the metal substrate which is sufficiently good for spectacle frames. Even when the Thermosol process, described by Moncrieff, is applied per se, the dye penetration is insufficient to be completely satisfactory in a polyester which is likely to be subject to harsh solvents. None of the above prior art references include the application of charged polyester powder particles onto a heated surface, with the result that a satisfactory surface finish would be difficult to attain.

BRIEF SUMMARY OF THE INVENTION

In this invention a thick coat of polyester powder is imparted onto a heated spectacle frame, some of the powder is removed from the frame hinges and replaced with a thin coat, the coated product is baked to fuse the powder and subsequently immersed in a heated acqueous dispersion of a disperse type dye, and the dyed product is subsequently reheated to a temperature sufficient to cause dye diffusion into the fused coating.

This process gives a surprising result in that the thick coat of resin becomes penetrated by the dye to a much greater depth than can be achieved by known prior art methods, so that for example the finished product could be exposed to acetone or lacquer thinners without serious damage to the appearance.

The usual way in which a polyester coating is applied to a spectacle frame is for the frame to be supported by a holder and for a polyester powder to be directed from a gun, through an electrostatic field and onto the frame. The frame is subsequently heated. However, one of the problems encountered with spectacle frames heretofore has been that the polyester or other plastics material is readily removed from the frame, since it is usually very thin. By directing the powder onto the frame when it is heated, the particle adhesion is better than if it is directed onto a cold metal surface, and a satisfactory surface finish can be finally achieved.

If a metal frame is lacquered, the colour is somewhat dull and lifeless, and with the object of providing an improved appearance and also improved adhesion, in an aspect of this invention the metal frame is firstly blasted with a granular material (for example silicon carbide) and this has the effect of forming minor indentations in the metal which further results in improved adhesion and provides small reflective surfaces beneath the layer of resin or enamel which add considerable lustre to the appearance, and also reduces visually, any imperfections which may exist on the plastic surface (ripples), notwithstanding the improvements achieved by this invention.

A problem which has been encountered in the coating of a spectacle frame has been the heavy build up which is enhanced by the coating of the frame with a lacquer or a polyester resin at the location of the hinge between the side arms and the lens retaining rings, and also at the locations of flexible mountings of the nose pieces. By selective removal of some of the thick resin powder coat by means of a vacuum conduit, at the locality of the frame hinges, and subsequent reapplication of the particulate material but at a relatively small depth, the problem is overcome of "welding" of the relatively movable part by the polyester. However, it also retains the continuous appearance.

BRIEF DESCRIPTION OF THE DRAWINGS

An embodiment of the invention is described hereunder in some detail with reference to, and is illustrated in, the accompanying drawings, in which.

Figure 1:
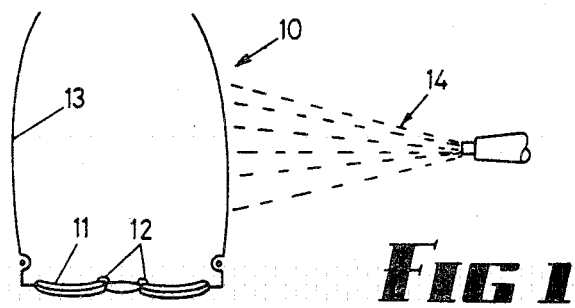
FIG. 1 illustrates diagrammatically a first step in a method of colour coating a spectacle frame.

In this embodiment a spectacle frame 10 adapted to be worn by a person and having lens support portions 11, nose piece portions 12 and foldable side wings 13, is firstly dry blasted with 180 grit silicon carbide powder 14 (FIG. 1). This process minimises the amount of expensive hand polishing required and reduces the likelihood of reject frames being caused by operator error.

The size of the carbide grit may vary, as may also the air pressure of application, but it is found that a 180 grit silicon carbide applied under a pressure of 10 psi, will provide the desired final surface reflectivity. The length of time can be varied to suit conditions, but in most instances need be only a very short period of time, and there is little to be gained by continuing to blast after the necessary surface cleanliness and formation has been established. The blasting causes localised indentation of the metal surface, that is the metal surface becomes a series of closely associated "valleys" and these provide not only a basis for light reflection of high lustre but also an excellent surface for plating purposes.

Figure 2:
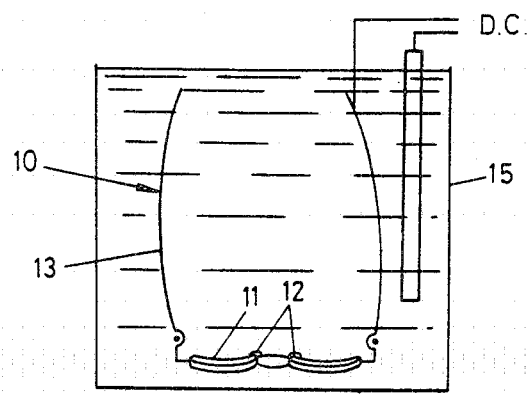
FIG. 2 illustrates a second step.

The next stage (FIG. 2) is to nickel plate the spectacle frame in a plating bath 15. The nickel plating provides a basic corrosion protection for the base metal, and covers with an envelope of nickel any very fine particles of silicon carbide which may have become embedded in the base metal. The undulating surface which reflects the light (scatters) becomes more reflective so that the lustre is improved.

Figure 3:
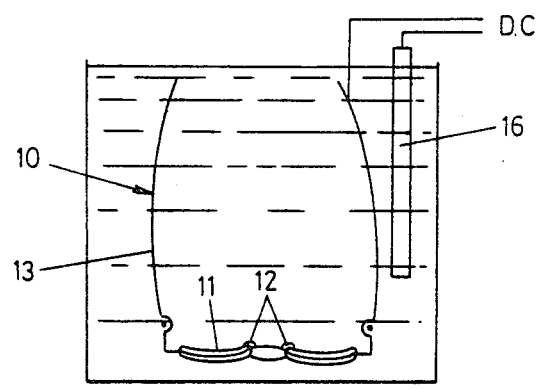
FIG. 3 illustrates a third step.

To still further improve the lustre, and also to provide a good perspiration protection to areas of the frame which have not been protected with a plastic coating (for example nose pad protectors or base metal), a thin plating of chromium or rhodium is applied to the metal, in the appropriate plating bath 16 (FIG. 3). This has a still further advantage in providing a constant colour to the base metal reflectivity. It avoids the likelihood of impurities in the nickel plate from causing a yellow colour cast to the polyester which is subsequently applied.

The next stage in the process is the preparation of the frame prior to powder coating.

It is essential that the inside surfaces of the eye wires (lens support portions 11) of the frame are not heavily built up by the powdered polyester resin. This would otherwise cause a large problem with the insertion of optical lenses.

Figure 4:
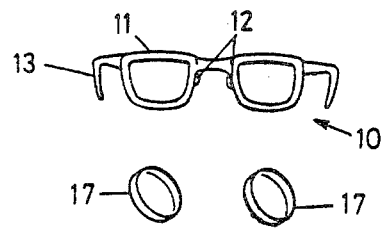
FIG. 4 illustrates a fourth step.
Figure 4A:
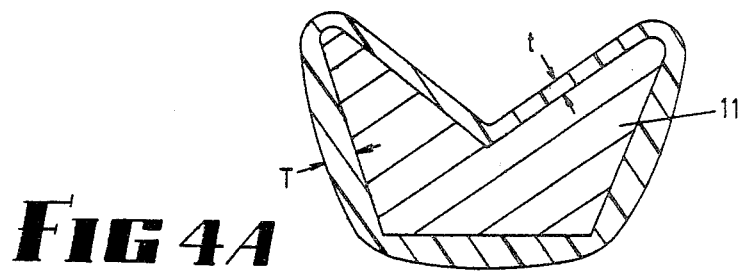
FIG. 4a shows a cross-section (to an enlarged scale) of an eye wire after coating.

In order to avoid this difficulty, the inside surfaces are covered with respective loop lengths 17 of masking tape (FIG. 4), and this avoids the powder penetrating the channel.

When the spectacle glasses are fitted, they can be ground to a very small tolerance (usually about ±0.1 mm) and by avoiding the build up of plastic materials in the grooves, a correspondingly accurate tolerance can be retained in the lens support portions 11.

The next step is the pre-heating of the frames prior to powder coating.

Figure 5:
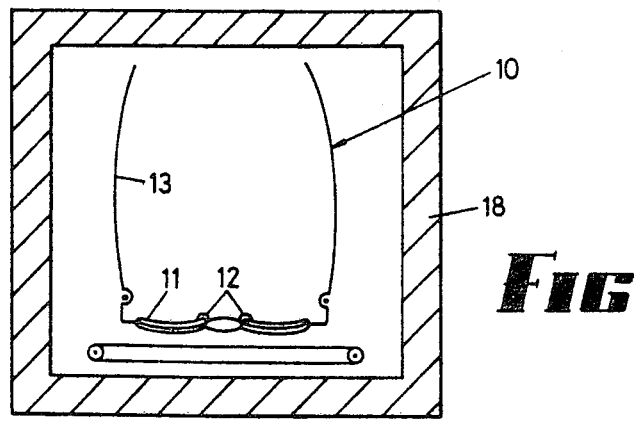
FIG. 5 illustrates a fifth step.

The frames are heated to a temperature of between 60° C. and 100° C., in this embodiment about 80° C. for about between one and two minutes in an oven 18 (FIG. 5). This is found to provide means whereby a more satisfactory surface finish can be achieved with a thick coating of plastic applied to the frame than can be achieved under ambient temperature conditions. Furthermore, the thickness of coating applied to the frame is more even throughout the area, resulting in a final product which is much more evenly coated. It should be noted however, that heating is unnecessary with some polyester powders.

The next stage is the selection of powder and the application of that powder to the frame.

Figure 6:
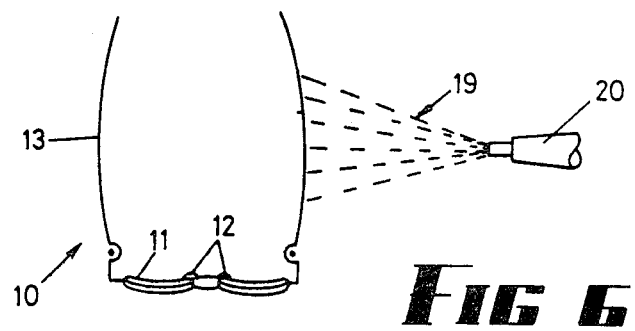
FIG. 6 illustrates a sixth step.

The powder which is used in this embodiment is a clear powdered polyester having a particle size between 30 micron and 150 micron. The powder 19 is applied by an electrostatic gun 20 (FIG. 6) in accordance with known art, the powder particles passing through an electrostatic field which charge the particles and cause them to be attracted to the hot metal surface.

Figure 7:
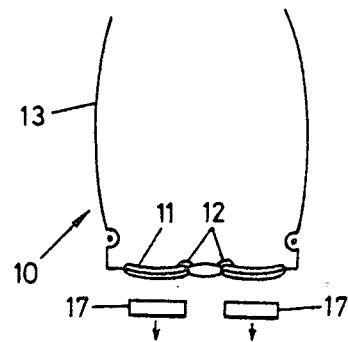
FIG. 7 illustrates a seventh step.
Figure 8:
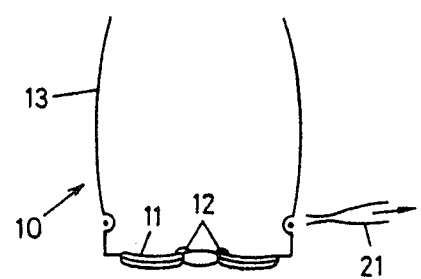
FIG. 8 illustrates an eighth step.

Before the powder is finally baked onto the metal surface the masking tape loops 17 are removed from the lens support portions 11 (FIG. 7), a vacuum tube 21 is located adjacent the two hinges and the two nose pieces, and the two rim locking blocks, and this removes the powder from those localities.

The very small amount of powder which is re-applied at those localities is applied without heating the frame, but is so thin that it will have no deleterious effect on the functioning of the spectacle frame.

Figure 9:
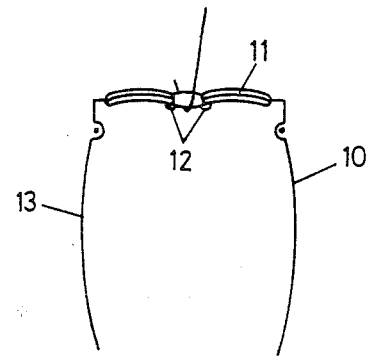
FIG. 9 illustrates a ninth step.

A serious problem is often encountered if the metal of the eyewire is subjected to the corrosive effects of perspiration. Under humid conditions, perspiration can run down the lens and come into contact with the metal of the eyewire, if the coating is discontinuous. Without the masking tape loops 17 (FIG. 4), the groove of the eyewire becomes filled with powder to such an extent that the eyewire ceases to be useful. It is therefore desirable to have a thick coating "T" around the outside of the eyewire of the lens supports 11, and a thin coating "t" on the surfaces which define the eyewire groove (FIG. 9). In this embodiment, the thickness "T" exceeds 60 microns, and the thickness "t" is less than 30 microns.

Figure 10:
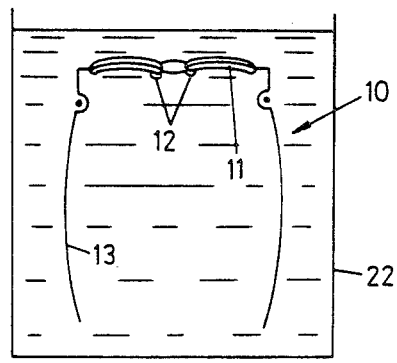
FIG. 10 illustrates a tenth step.

The frames are baked in an oven at a temperature of between 170° C. and 250° C., but in this embodiment 200° C. for a period of between 12 and 18 minutes, so as to fuse the powder and thereby form a continuous film from the powdered polyester. The frames are placed with the side wings 13 vertical to the ground and with the lens support portions 11 parallel, as shown in FIG. 10. This is different from prior art which functions in the other way. However, by utilising this method of suspension, the powder melts to a smooth even finish coating, with less ripple in the plastics surface than is otherwise evident if the frame is suspended in the conventional manner.

At this stage the frames are covered with a smooth finish polyester film of about 100 microns (between 75 and 150). The next step of the process is the colouring of the plastics material.

Figure 11:
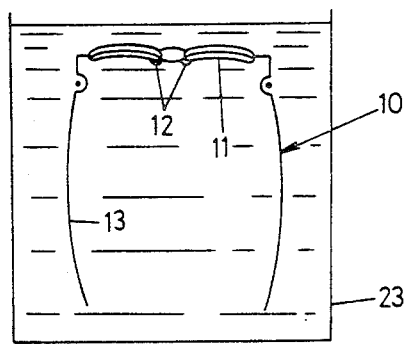
FIG. 11 illustrates an eleventh step.

The plastics material is prepared for colouring by firstly immersing in a bath 22 of hot caustic soda solution for a period of about one minute (FIG. 11). This has the effect of softening the surface of the resin film and facilitating dye penetration, and reducing danger of development of "spotting".

Figure 12:
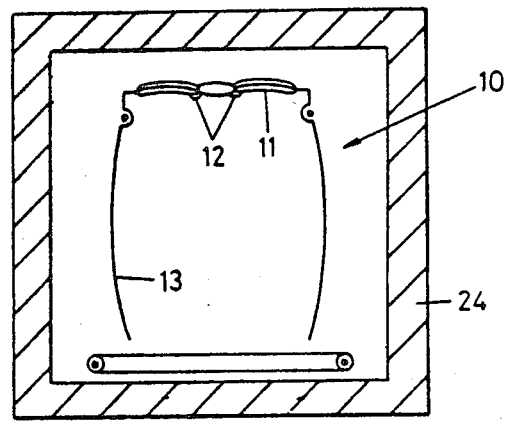
FIG. 12 illustrates a twelfth step.

The frames are removed from the caustic bath 22, washed in hot water, and are then immersed in the dye bath 23 containing an aqueous dye dispersion (FIG. 12) at a temperature of about 85° C. (between 75° C. and 95° C.) for a length of time which is selected to give a shade of colour which is deemed to be desirable. The dye bath is maintained at a pH of between 5 to 7 in order to avoid colour change. Correction of colour change can then be effected with small additions of dye, but if the dye bath is too acidic (below say pH 4), or too alkaline, the quantity of dye needs to be increased considerably. Deeper shades will result from deeper penetration into the polyester layer, lighter shades a shallower penetration, and the shade is a function of the time of immersion as well as temperature and selection of dye. One dye which is suitable for colouring polyester is a disperse type dye sold under the Trade Mark DYLON as "DYLON POLYESTER DYE", by Dylon International Ltd., Lower Sydenham, London, England. It should be noted that Class A and Class B disperse type dyes are more suitable than other available dyes. Class A and Class B are the highest two ratings of five ratings of the migration properties of a dye, assessed by detemining the SDC Grey Scale (for assessing change in colour) contrast between initially dyed and undyed pieces. The reader is referred to The Journal of the Society of Dyers and Colourists, Volume 80, No. 5, 1964, published by the Society in Great Britain. Further references will be found in the May 1965 edition, page 210, and in various textbooks. However, azo, or anthraquinone dyes are also suitable. Anioni dyes are not accepted by polyester resins because polyester is not ionisable, and direct or reactive dyes have no cross-linking ability with polyester. Although use of a carrier (swelling agent) is discussed as being advantageous by Moncrieff (above), this is most undesirable in this application because of deleterious effects on adhesion. The use of any chlorinated solvent (e.g. trichlorobenzene, dichlorobenzene, monomethyl napthalene or diphenyl) should be avoided for the same reasons.

Figure 13:
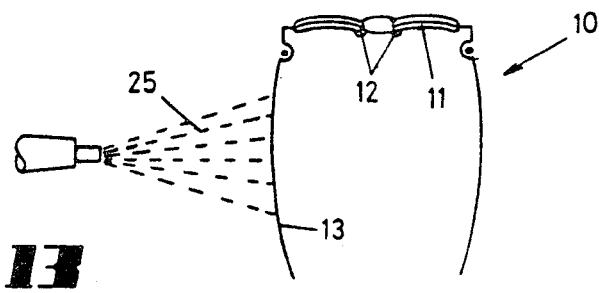
FIG. 13 illustrates a thirteenth step.

After the plastic coating has been so coloured, it is desirable that the surface should be so treated that certain solvents will be unlikely to damage the appearance. This is achieved by placing the frames into an oven 24 (FIG. 13) which is standing at 200° C. or therabouts for a sufficient period of time for the top layer of the polyester to at least partly remelt, and one suitable period of time is 90 seconds. The refusing of the top layer (which occurs when the layer reaches a temperature of between 150° C. and 170° C.) causes the dyed portion of the polyester to be coated with a smooth layer which is resistant to certain known solvents which might otherwise damage the surface. The colours penetrate more deeply into the polyester and any damage which does take place is likely to be very superficial.

Figure 14:
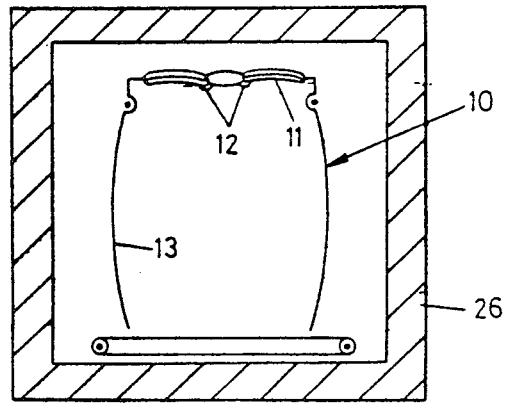
FIG. 14 illustrates the final step of the method.

Although the polyester coating has excellent resistance to most chemicals to which it may be subjected, it can still be attacked by certain products, especially those with a high pH value (e.g. diesel fuel, caustic material, certain oils and aromatics, and certain amino acids). As shown in FIG. 14, a wet spray 25 of polyurethane is applied to the product, to build up a layer of about 20 micron thickness. This is then baked in an oven 26 at a temperature of between 60° C. and 80° C. for 30 minutes (FIG. 15). It is important not to overcure the underlying dyed polyester resin, since overcuring can cause a colour change. The polyurethane can itself be pigmented. One suitable polyurethane is sold by Dulux Australia Limited of McNaughton Road, Clayton, Victoria as "DULUX ACRAN". It has been found that the polyurethane layer not only increases resistance to chemical attack, but improves the flexibility of the product and resists crazing. It should be noted, however, that a satisfactory layer of polyurethane will not be achieved if the coloured polyester plastic film is insufficiently heated in the refusing process.

A consideration of the above embodiment will indicate that the invention makes possible a product which is superior in its characteristics to products produced by prior art methods.

The blasting gives a light scattering effect which improves lustre, the covering with nickel and subsequently with chormium or rhodium improves not only the resistance to corrosion but also improves the lustre of the product.

The application of a polyester coating on days of high humidity has heretofore resulted sometimes in a "ripple" finish, but by preheating the frames and having a thicker plastic coating, a smooth finish is achieved even on days of high humidity.

The masking of the channel areas, and the removal of excess powder with a vacuum, provides a frame which has consistently high quality.

Refusing of the resin after application of colour is also found to provide a finish which is much superior to that which has been achieved by previous methods.

In the above description, the invention is applied to a glasses frame this being a difficult product to colour.

I claim:

1. A method of colour coating a metal spectacle frames or a sunglasses frame having hinges joining relatively movable parts of such frame which includes the steps of masking the inner surfaces of thelens support portions of said frame with masks, coating the frame with a thick coat of polyester powder by electrostatic spray means, removing the masks from the frame and applying a thin coat of polyester powder to said inner surfaces, baking the coated frame at a sufficiently high temperature to fuse said powder, immersing the coated frame in a hot aqueous dye dispersion in the absence of any dye carrier, and for a length of time which is controlled to effect a depth of colour in said fused powder, removing the coated frame from the dye dispersion, and heating the coated frame to a temperature sufficient to cause diffusion of the dye into said fused coating.

2. A method of colour coating an article according to claim 1 further including the steps of sand blasting the surface of the metal frame with an abrasive grit, and electroplating the frame with a reflective metal, before said step of coating the frame with polyester powder.

3. A method of colour coating a metal spectacle frame or sunglasses frame according to claim 1 or claim 2 further including the step of preheating said frame and effecting said step of coating the frame with a resin based plastic powder while the frame is at superatmospheric pressure.

4. A method of colour coating a spectacle frame or sunglasses frame having hinges joining relatively movable parts of such frame, comprising the steps of (a) grit blasting the surface of the frame with silicon carbide grit, (b) electroplating the frame with a reflective metal, (c) heating the frame to a temperature of about 80° C., but less than the fusion temperature of a polyester coating powder, (d) coating the heated frame with said powder by electrostatic spray means, (e) baking said coated frame at a temperature of between 170° C. and 250° C. to fuse the powder and form an enveloping film thereof, (f) immersing the coated frame in an aqueous dye dispersion in the absence of any dye carrier and at a temperature of between 75° C. and 95° C., and for a sufficient length of time, to effect a depth of colour in said fused powder, (g) removing the coated frame from the dye solution, and, (h) heating the coated frame to a temperature of between 150° C. and 170° C., sufficient to cause diffusion of the dye into said fused coating.

5. A method according to claim 4 comprising the further step of masking inner surfaces of the lens support portions of said frame with masks before said coating of the heated frame in accordance with step (d), but removing said masks before baking said coated frame to fuse the powder and to form an enveloping film thereof.

6. A method according to claim 4 comprising the further step of reapplying said thin coat of polyester powder when the frame is at ambient temperature, to form a "coating" of less thickness than the coating formed in accordance with step (d).

7. A method according to claim 4 comprising the further step of immersing said coated frame in hot caustic soda solution after baking in accordance with step (e), but before immersing in accordance with step (f).

8. A method according to claim 4 comprising the further step of spraying said coated frame with polyurethane after said heating in accordance with step (h).

9. A method according to claim 8 comprising the further step of baking the coated frame after spraying with polyurethane to a temperature of between 60° C. and 80° C.

* * * * *